United States Patent [19]

Schlegel et al.

[11] Patent Number: 5,374,306
[45] Date of Patent: Dec. 20, 1994

[54] LUSTER PIGMENTS BASED ON METAL OXIDE-COATED ALUMINUM PLATELETS HAVING A TOTAL CARBON CONTENT OF LESS THAN 0.1% BY WEIGHT

[75] Inventors: Reinhold Schlegel, Hassloch; Norbert Mronga, Dossenheim; Reinhold Rieger, Ludwigshafen, all of Germany

[73] Assignee: BASF Aktiengesellschaft, Ludwigshafen, Germany

[21] Appl. No.: 84,149

[22] Filed: Jul. 1, 1993

[30] Foreign Application Priority Data

Jul. 16, 1992 [DE] Germany .................... 4223384

[51] Int. Cl.$^5$ ................................ C09C 1/62
[52] U.S. Cl. .................... 106/404; 106/415; 106/459
[58] Field of Search ............ 106/404, 415, 459

[56] References Cited

U.S. PATENT DOCUMENTS 4,328,042  5/1982  Ostertag et al. ............ 106/403

OTHER PUBLICATIONS

Derwent Abstracts, NAE 364192, Nov. 19, 1984, JP-A-1303751 & Jun. 18, 1986, "Prepn. of Coloured Aluminum Powder-by Dipping in Weak DI:Chromate Acid Soln. Fluoride with Nonionic Surfactant, then treating Dried Prod. with Fatty Acids (Deriv.)".
Derwent Abstracts, NAE 364192, Dec. 13, 1977, JP-A-813371 & Jun. 28, 1979, "Pigment Compsn. having Metallic Lustre-Contains Aluminum Powder with Coating of Hydrating Iron Oxide and Iron Oxide Pigment".

*Primary Examiner*—Karl Group
*Assistant Examiner*—Chris Gallo
*Attorney, Agent, or Firm*—Oblon, Spivak, McClelland, Maier & Neustadt

[57] ABSTRACT

There are described luster pigments based on metal oxide-coated aluminum platelets wherein the substrate aluminum platelets have a total carbon content <0.1% by weight, and the preparation and use of these pigments.

11 Claims, No Drawings

LUSTER PIGMENTS BASED ON METAL OXIDE-COATED ALUMINUM PLATELETS HAVING A TOTAL CARBON CONTENT OF LESS THAN 0.1% BY WEIGHT

The present invention relates to novel luster pigments based on metal oxide-coated aluminum platelets where the substrate aluminum platelets have a total carbon content <0.1% by weight, to a process for preparing these luster pigments, to the use thereof for coloring paints, printing inks, plastics, glasses, ceramic products and decorative cosmetic preparations, and to the aluminum platelets having a total carbon content <0.1% by weight for use as intermediates for the pigments of the invention.

Metal oxide-coated, in particular iron oxide-coated, aluminum pigments are known per se. They usually are platelet-like substrate particles of metallic aluminum, in general with largest diameters of about 1–200 μm and a thickness of about 0.1–2 μm, coated with a metal oxide layer.

The optical effect of these pigments is due to a combination of the properties ascribable to the metallic substrate, such as metallic luster, lightness flop on viewing from different angles and hiding power, and of the color effect caused by the oxide layer. If the oxide layer is a colored layer, for example an iron oxide layer, this color effect is the result of a juxtaposition of the interference color, which depends on the thickness of the oxide layer, and the respective absorption color.

If the applied metal oxide layer is hematite ($\alpha Fe_2O_3$), a low iron content will result in pigments having a greenish yellow hue which, as the iron content increases (and the oxide layer thickens accordingly), will change via gold, golden red and orange into deep red. Since these pigments are notable primarily for cleanness of hue, high hiding power and high weathering fastness, they are of particular interest for coloring paints, printing inks and plastics.

However, prior art metal oxide-coated aluminum pigments have application disadvantages, not least due to the frequently inadequate adhesion of the oxide layer to the metallic substrate. For instance, the mechanical stress of dispersing in binders will result in the abrasion of the metal oxide and hence in undesirable color changes. In some cases gas evolution and, on prolonged storage, hue shifts are observed even in aqueous binder systems.

Nor are existing processes for preparing these pigments completely convincing. First, the pigments thus obtainable have the above mentioned disadvantages; secondly, pigments having the same chromaticity coordinates, in particular the same chroma (C* of the CIE-LAB system), are difficult to prepare reproducibly.

A further problem with the aqueous processes as described for example in JP-A-81 337/1979 and 130 375/1986 is that the aluminum particles react during the coating step with the evolution of hydrogen. It is also necessary to maintain certain reaction conditions, for example a certain pH, and to use costly ancillaries, for example complexing agents. And, after coating, the pigments have to be isolated in a costly manner.

There are also problems with the more advantageous gas phase process, described for example in EP-A-33 457, where vaporized metal compounds are oxidatively or hydrolytically decomposed in the presence of agitated substrate particles. For instance, the particles are observed to agglomerate during the coating step, causing a reduction in the useful fraction of the particles having average diameters of in general <32 μm and inhibiting the uniform coating of all substrate particles.

It is an object of the present invention to make available metal oxide-coated aluminum pigments which are free of the aforementioned disadvantages and also a process whereby these pigments are inexpensive to prepare reproducibly.

We have found that this object is achieved by luster pigments based on metal oxide-coated aluminum platelets wherein the substrate aluminum platelets have a total carbon content <0.1% by weight.

We have also found a process for preparing these luster pigments, which comprises
  a) treating the conventionally prepared substrate aluminum platelets under agitation with an oxygen-containing gas and if desired additionally with steam at elevated temperature to reduce their total carbon content to below 0.1% by weight, and
  b) coating the resulting aluminum platelets with a metal oxide in a conventional manner by gas phase decomposition of volatile metal compounds using oxygen and/or steam.

We have also found a method of using these luster pigments for coloring paints, printing inks, plastics, glasses, ceramic products and decorative cosmetic preparations.

According to yet another aspect of the invention there are provided aluminum platelets having a total carbon content <0.1% by weight obtainable by treating the conventionally prepared aluminum platelets as per the process step a) defined in claims 3 to 9.

The luster pigments of the invention are notable for the fact that their metallic substrates have a low total carbon content of <0.1% by weight, preferably <0.05% by weight, particularly preferably 0.04% by weight. There is in principle no lower limit for the carbon content. The only essential requirement for achieving the desired properties is that the upper limit of 0.1% by weight must not be exceeded. In general, the aluminum platelets will have a total carbon content within the range from about 0.01 to 0.1% by weight.

The total carbon content is in effect a measure of the level of organic impurities in the aluminum platelets.

These organic impurities are in general lubricants such as oleic or stearic acid and fatty amines which are customarily used in the production of the aluminum platelets by grinding to prevent any cold welding of the platelets. This is in fact the only inexpensive way of obtaining the desired thin platelets <1 μm in thickness. As processed these aluminum platelets thus have a residual carbon content of about 0.6–1.5% by weight. This carbon content is also present in aluminum platelets produced by grinding in an organic solvent such as naphtha.

In existing processes for producing metal oxide-coated aluminum pigments, the aluminum platelets are not subjected to any special cleaning or purification. However, conventional methods such as washing with organic solvents and/or drying under reduced pressure at elevated temperatures are in general not able to reduce the total carbon content to below 0.5% by weight, which is why the pigments exhibit the above mentioned disadvantages after coating.

The metal oxide layer can be composed of the highly refractive, colorless or colored metal oxides or mixtures thereof customarily used for producing luster pigments.

Examples of preferred oxides are titanium oxide, zirconium oxide, tin oxide and chromium oxide. Because of the resulting color effects there is a particular preference for iron oxide, in particular $\alpha$-$Fe_2O_3$.

If desired, an additional metal oxide may be applied in the form of a preferably colorless top coat. Suitable for this coating are for example silicon oxide and aluminum oxide or hydroxide as well as the colorless metal oxides mentioned earlier.

The luster pigments of the invention are brilliant and strong in color, their chroma being 15 units higher than that of prior art pigments. Moreover, they have a firmly adhering metal oxide coat and show an appreciably better constancy of hue when stored in aqueous and nonaqueous binder systems.

The luster pigments can be prepared with advantage by the process of the invention by subjecting aluminum platelets obtained using the above-described, conventional method which aluminum platelets have a total carbon content >0.5% by weight, initially in a first step a) to a cleaning or purifying operation and then in a second step b) to a conventional coating with metal oxide.

The process of the invention is preferably carried out in a fluidized bed reactor in which the aluminum particles are fluidized by means of an inert gas such as argon or in particular nitrogen and into which the respective treatment gases are blown and thus come to envelop the metal particles. However, the purifying/cleaning step a), in particular, can also be carried out in a different apparatus which permits through mixing, for example in a rotary flask.

In step a) the aluminum particles are treated at elevated temperature with an oxygen-containing gas and if desired additionally with steam.

The process conditions are advantageously chosen in such a way that the aluminum particles do not ignite.

The reaction temperature is therefore in general from 150° to 270° C., preferably from 180° to 220° C.

The oxygen-containing gas used is preferably a mixture having an oxygen content of from 1 to 5% by volume, in particular from 2 to 4% by volume. Particular preference is given to air/nitrogen mixtures of the right composition. If the preferred fluidized bed reactor is used, sufficient air is blown in for the mixture of fluidizing gas and air to have the abovementioned oxygen content.

The oxidizing treatment generally takes from 2 to 12 h.

To obtain aluminum platelets having particularly low carbon contents of about <0.05% by weight, it is advisable to carry out an additional treatment with steam. This treatment is preferably carried out after the first treatment with the oxygen-containing gas alone. However, the steam can also be introduced with the other gas right from the start.

It is advantageous to feed in addition to the inert gas (nitrogen) in the air sufficient steam for the resulting gas mixture to have a water vapor content of in general from 0.5 to 3% by volume, preferably from 1 to 2.5% by volume.

The steam treatment generally takes from 0.5 to 1 h.

The overall treatment is carried on until the desired carbon content of less than 0.1% by weight is reached.

The effect is to remove from the aluminum surface not only physically but also chemically attached organic impurities. The resulting low-fat, hydrophilic surface is highly suitable for depositing metal oxide layers which will adhere firmly.

The subsequent coating with metal oxide (step b) is carried out in a conventional manner by gas phase decomposition of volatile compounds of the metals using oxygen and/or steam, as described for example in EP-A-33 457, preferably likewise in a fluidized bed reactor. The purified/cleaned aluminum substrate thus does not have to be first discharged, but can advantageously be coated directly in the same reactor, if necessary after it has cooled to the desired reaction temperature.

A desired additional metal oxide top coat can likewise be applied directly following the first coat, for example with iron oxide.

Suitable metal compounds are the compounds usually used for this purpose and described for example in the earlier German Patent Application P 42 17 511.9 such as the carbonyls, halides, in particular chlorides, and alkoxides. Specific examples are titanium tetrachloride, zirconium tetrachloride, silicon tetrachloride, tin tetrachloride, aluminum chloride, titanium n-isopropoxide, titanium isopropoxide, chromium hexacarbonyl and preferably iron pentacarbonyl.

The carbonyls are advantageously oxidized with oxygen mixed with nitrogen, while the halides and alkoxides are hydrolyzed with steam, although in the case of the halides oxygen can be present.

It is advantageous to blow the vaporized metal compound and the respective reaction gas (oxygen or air and/or steam) at >100° C., preferably at from 150° to 300° C., into the fluidized bed of aluminum particles (fluidizing gas generally nitrogen), for which the amount of vaporized metal compound will in general not exceed 5% by volume, preferably not more than 2% by volume, of the total amount of gas in the reactor.

The process of the invention makes it possible to prepare the advantageous luster pigments having low carbon contents in a simple manner and—regardless of the particular aluminum batch used—reproducibly. Moreover, the process of the invention ensures uniform coating of virtually all substrate particles (in general 98–99% of the particles). No agglomeration of the pigment particles is observed; if, for example, an aluminum pigment having the total carbon content of 0.04% by weight required by the invention and an average particle diameter of 13.8 $\mu$m is coated with $Fe_2O_3$ until a yellowish golden color is obtained, then the average particle diameter only increases to 15.1 $\mu$m, and the useful, fine portion <32 $\mu$m decreases only slightly from 99.0% to 98.6%.

The luster pigments of the invention are advantageous for many applications, in particular for coloring paints, printing inks and plastics.

EXAMPLES

Iron oxide-coated aluminum pigments are prepared using a two-shell, oil-heated stainless steel fluidized bed reactor built from 3 parts:

1. a middle, cylindrical part having a diameter of 30 cm and a height of 1.5 m;
2. a lower, conical part tapering over 50 cm to 5 cm and equipped with a fluidizing gas connector, a carbonyl inlet nozzle and a pigment outlet port; and
3. an upper, lid part equipped with 4 built-in filter socks to be cleaned with nitrogen pulses from a jet, and a pigment inlet port.

To assess the coloristics of the pigments obtained, 4 g of each pigment sample were incorporated into 96 g of a polyester varnish having a solids content of 21% by weight (adjusted to an efflux time of 35 sec from DIN cup 4 by diluting with butyl acetate) by dispersing for 15 min with a propeller stirrer (IKA-Rührwerk from Janke und Kunkel) at 1500 rpm.

The pigmented varnishes were then applied with an electrically driven film applicator (from Braive Instruments) to the coated side of a white Chromolux card (700/350 g, size 30×45 cm) at a rate of 10 mm/sec using a 200 μm box drawbar (from Erichsen, Type 335, width 25.5 cm). Following a flash-off time of 20 min at room temperature, the film was again drawn down to 200 μm and flashed off for another 20 min. The card was then baked at 90° C. for 30 min.

The CIELAB values were measured in the drawing direction on the middle part of the drawdown using a DATACOLOR spectro-photometer MSC 111 with a metallic measuring head GK 111 at an angle of from 20° to 70° to the luster angle. The reported lightness L, hue angle H* and chroma C* relate to the standard illuminant D65 and a viewing angle of 25°, 45° and 70°.

EXAMPLE 1 a) In the fluidized bed reactor 8 kg of aluminum pigment (average particle diameter 19 μm, specific BET surface area 3.6 m$^2$/g, carbon content 1.2% by weight) were heated to 190° C. under fluidization with nitrogen at 8.2 m$^3$/h. The fluidizing gas was first admixed with air at 1.2 m$^3$/h and after 10 h additionally over 1 h with 600 ml of water in the form of water vapor.

A sample of the aluminum pigment thus treated had a carbon content of 0.07% by weight.

b) Vaporized iron pentacarbonyl in 850 l/h carrier gas stream of nitrogen was then additionally introduced via the carbonyl nozzle at arate of 600 g/h. After 6000 g of Fe(CO)$_5$ had been introduced, the supply of carbonyl, air and water vapor was discontinued.

Cooling left 10.33 kg of a golden-colored Fe$_2$O$_3$-coated aluminum pigment having an iron content of 16.5% by weight and a carbon content of 0.03% by weight (yield 98.9%). The pigment had a screening yield <32 μm of 90%. An optical microscope showed only very few aluminum particles to be still uncoated. The coloristic data of the pigment are listed below in the table.

COMPARATIVE EXAMPLE CE

Example 1 was repeated on 8 kg of the aluminum pigment without pretreatment. It was coated directly with iron oxide until a golden hue was obtained. This required 5500 g of Fe(CO)$_5$.

The yield was 10.06 kg of golden-colored Fe$_2$O$_3$-coated aluminum pigment having an iron content of 15.3% by weight and a carbon content of 0.25% by weight (the yield being 92.2% of theory). The pigment had a screen yield <32 μm of only 65%. Examination under an optical microscope revealed that 5% of the metal flakes had not been coated, since they had a silvery color. The coloristic data of the pigment are listed in the following table:

TABLE

| Ex. | Measuring geometry | Coloristic data | | |
|---|---|---|---|---|
| | | Lightness L | Hue angle H* | Chroma C* |
| 1 | 25° | 87.6 | 73.7 | 72.6 |
| | 45° | 47.5 | 73.0 | 47.1 |
| | 70° | 25.1 | 69.5 | 31.7 |
| CE | 25° | 87.6 | 72.6 | 64.9 |
| | 45° | 51.1 | 72.3 | 44.3 |
| | 70° | 27.9 | 68.9 | 30.1 |

We claim:

1. In luster pigments based on metal oxide-coated aluminum platelets, the improvement comprising employing as substrate aluminum platelets aluminum platelets having a total carbon content <0.1% by weight.

2. Luster pigments as claimed in claim 1 wherein the aluminum platelets have been coated
   A) with a first coat consisting essentially of iron oxide, and
   B) optionally with a second coat consisting essentially of a colorless metal oxide.

3. A process for preparing the luster pigments of claim 1, which comprises
   a) treating the conventionally prepared substrate aluminum platelets under agitation with an oxygen-containing gas and optionally additionally with steam at elevated temperature to reduce their total carbon content to below 0.1% by weight, and
   b) coating the resulting aluminum platelets with a metal oxide in a conventional manner by gas phase decomposition of volatile metal compounds using oxygen and/or steam.

4. A process as claimed in claim 3, wherein the oxygen-containing gas of step a) contains from 1 to 5% by volume of oxygen.

5. A process as claimed in claim 3, wherein the oxygen-containing gas of step a) is an air/nitrogen mixture.

6. A process as claimed in claim 3, wherein the oxygen-containing gas of step a) has added to it for an additional water vapor treatment from 0.5 to 3% by volume of water vapor.

7. A process as claimed in claim 3, wherein, in step a), the aluminum platelets are treated initially with the oxygen-containing gas only and subsequently additionally with the water vapor-containing gas.

8. A process as claimed in claim 3, wherein the step a) treatment of the aluminum platelets is carried out at from 150° to 270° C.

9. A process as claimed in claim 3, carried out in a fluidized bed reactor.

10. In a process for coloring paints, printing inks, plastics, glasses, ceramic products and decorative cosmetic preparations, the improvement comprising selecting as a colorant a luster pigment of claim 1.

11. Aluminum platelets having a total carbon content <0.1% by weight, obtained by treating conventional aluminum platelets having a carbon content >0.1% by process step a) of claim 3.

* * * * *